United States Patent
Billig

(10) Patent No.: US 7,248,957 B2
(45) Date of Patent: Jul. 24, 2007

(54) CONTROL DEVICE FOR AN AT LEAST PARTIALLY FOUR-WHEEL-DRIVEN MOTOR VEHICLE

(75) Inventor: Christian Billig, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 11/336,933

(22) Filed: Jan. 23, 2006

(65) Prior Publication Data

US 2006/0148617 A1    Jul. 6, 2006

Related U.S. Application Data

(63) Continuation of application No. PCT/EP2004/008092, filed on Jul. 17, 2004.

(30) Foreign Application Priority Data

Jul. 24, 2003    (DE)    ................. 103 33 654

(51) Int. Cl.
  *F16D 48/12*    (2006.01)
  *B60K 23/08*    (2006.01)
  *G06F 19/00*    (2006.01)
(52) U.S. Cl. ............... 701/69; 701/67; 701/93; 192/54.1; 180/248
(58) Field of Classification Search ............ 701/67, 701/68, 69, 93; 477/171, 179; 192/54.1; 180/247, 248
See application file for complete search history.

(56) References Cited

U.S. PATENT DOCUMENTS 4,762,021 A * 8/1988 Teraoka .............. 74/665 GA
5,060,747 A * 10/1991 Eto .................... 180/197
5,219,038 A    6/1993 Hamada et al.
5,411,110 A * 5/1995 Wilson et al. .......... 180/247

(Continued)

FOREIGN PATENT DOCUMENTS

DE    3427725 C2    8/1985

(Continued)

OTHER PUBLICATIONS

International Search Report for PCT/EP2004/008092 dated Nov. 18, 2004.
German Examination Reports for 103 33 654.0-51.

*Primary Examiner*—Tan Q. Nguyen
(74) *Attorney, Agent, or Firm*—Crowell & Moring LLP

(57) ABSTRACT

In the case of a control device for an at least temporarily four-wheel-driven motor vehicle, having a control unit which can variably distribute the driving torque of a drive unit as a function of operating conditions to primary driving wheels, which are permanently connected with the drive unit, and to secondary driving wheels which, if required, can be connected by way of a transfer clutch with the drive unit, in that the control unit determines a desired clutch torque which is to be set by an actuator device at the transfer clutch, one operating condition is the vehicle speed. The control unit is further developed such that, when the desired clutch torque is determined, at least one defined high-speed range is taken into account and in that a speed-range-related clutch torque assigned to the high-speed range is defined as a maximally permissible limit torque.

18 Claims, 3 Drawing Sheets

U.S. PATENT DOCUMENTS

| | | | | |
|---|---|---|---|---|
| 5,993,354 | A | * | 11/1999 | Winks .................. 477/107 |
| 6,071,207 | A | * | 6/2000 | Stephens et al. ............ 475/204 |
| 6,105,703 | A | | 8/2000 | Kuroda et al. |
| 6,386,351 | B1 | * | 5/2002 | Salecker et al. ........... 192/54.1 |
| 2002/0147537 | A1 | | 10/2002 | Nishida et al. |

FOREIGN PATENT DOCUMENTS

| | | |
|---|---|---|
| DE | 3714330 C2 | 11/1988 |
| DE | 10054023 A1 | 5/2002 |
| EP | 0963892 A2 | 12/1999 |

* cited by examiner

CONTROL DEVICE FOR AN AT LEAST PARTIALLY FOUR-WHEEL-DRIVEN MOTOR VEHICLE

BACKGROUND AND SUMMARY OF THE INVENTION

The present application is a continuation of International Patent Application No. PCT/EP2004/008092, filed Jul. 17, 2004, and claims priority under 35 U.S.C. § 119 to German Application No. 103 33 654.0-51, filed Jul. 24, 2003. The entire disclosure of the aforementioned documents is herein expressly incorporated by reference.

The present invention relates to a control device for an at least partially four-wheel-driven motor vehicle. More particularly, the present invention relates to a control device for an at least partially four-wheel-driven motor vehicle, having a control unit which can variably distribute the driving torque of a drive unit as a function of operating conditions, to primary driving wheels, which are permanently connected with the drive unit, and to secondary driving wheels which, if required, can be connected by way of a transfer clutch with the drive unit, in that the control unit determines a desired clutch torque which is to be set by an actuator device at the transfer clutch.

A control device of this type is described, for example, in German Patent Document DE 100 54 023 A1. Accordingly, a torque distribution device is known for changing the torque distribution ratio between the wheels of a front axle and the wheels of a rear axle by a corresponding control of a friction clutch as a longitudinal blocking device (transfer clutch). The driving action of a vehicle can be influenced considerably by the determination of a torque distribution ratio. In particular, the object of German Patent Document DE 100 54 023 A1 relates to the driving dynamics when cornering. In this case, a temporarily four-wheel-driven motor vehicle may be a basically front-wheel-driven motor vehicle with a rear-wheel drive which can be connected by means of a transfer clutch; a basically rear-wheel-driven motor vehicle with a front-wheel drive which can be connected by way of a transfer clutch; or a permanent all-wheel drive vehicle with a controllable transfer clutch for changing the torque distribution between the front and rear axle.

Generally, as described below, primary driving wheels are the wheels that are permanently connected with the drive unit, and secondary driving wheels are the wheels that, if required, can be connected with the drive unit by way of the transfer clutch.

Furthermore, such known control systems usually have a control of the transfer clutch as a function of the rotational speed difference between a rotational speed of the primary driving axle and the rotational speed of the secondary driving axle (for example, German Patent Document DE 34 27725 C2).

It is an object of the present invention to improve a control system of the previously mentioned type with respect to the protection of components.

The present invention is based on the fact that, particularly for reasons of driving dynamics, the desired clutch torque should always be reduced as the vehicle speed increases. However, the considerations on which the invention is based take into account more than merely the driving dynamics and the driver's intention. In the case of any mechanical construction, with a view to the dimensioning of components, a compromise is required between the saving of cost and weight, on the one hand, and the stability, on the other hand. The object of the invention relates particularly to the differentials at the driving axles as well as the drive shafts as the components to be protected.

With respect to driving dynamics, the prevention of twisting is important at high speeds. Accordingly, at high speeds, the entire driving torque should basically be transferred to the primary driving wheels; the desired clutch torque should therefore be zero. With respect to wear, however, such a control would result in an increased temperature-caused stress as the dimensioning of the components decreases. This problem is solved by the part of the control device, which relates to a defined high-speed range, according to the present invention.

Particularly during the starting operation, with respect to the driving dynamics, the maximizing of the traction is important at very low speeds. When the driving torque is distributed corresponding to the axle load distribution of a vehicle, maximal traction is achieved. Naturally, an approximately uniform distribution is advantageous in this case, which automatically results in the best component protection. According to the invention, an unlimited traction optimization therefore takes place in a defined speed-related starting range.

At speeds in the normal range (particularly partial load), a distribution of the torque which optimizes the component stability is particularly advantageous, because most driving time takes place in the normal range. That is, according to the invention, a distribution of the driving torque is achieved, and, thus, a durable component protection is ensured (resistance to fatigue in the case of long-duration strain). In this case, the distribution of the driving torque has to be adapted approximately to the most unfavorably dimensioned component. Also in the normal range, a distribution which minimizes twisting would be more desirable. This would require a distribution of the entire driving torque to the primary drive shaft or driving axle. If, however, the components of the primary driving axle (particularly its differential) are not designed for such a long-term operation, a distribution of the driving torque corresponding to the fraction of the driving torque to be withstood for a long duration without destruction has to be defined.

The speed-range-related clutch torques assigned to the respective speed ranges basically comprise constant values as well as torque courses.

Other objects, advantages and novel features of the present invention will become apparent from the following detailed description of the invention when considered in conjunction with the accompanying drawings.

DETAILED DESCRIPTION OF THE EXEMPLARY EMBODIMENTS

Figure 1:
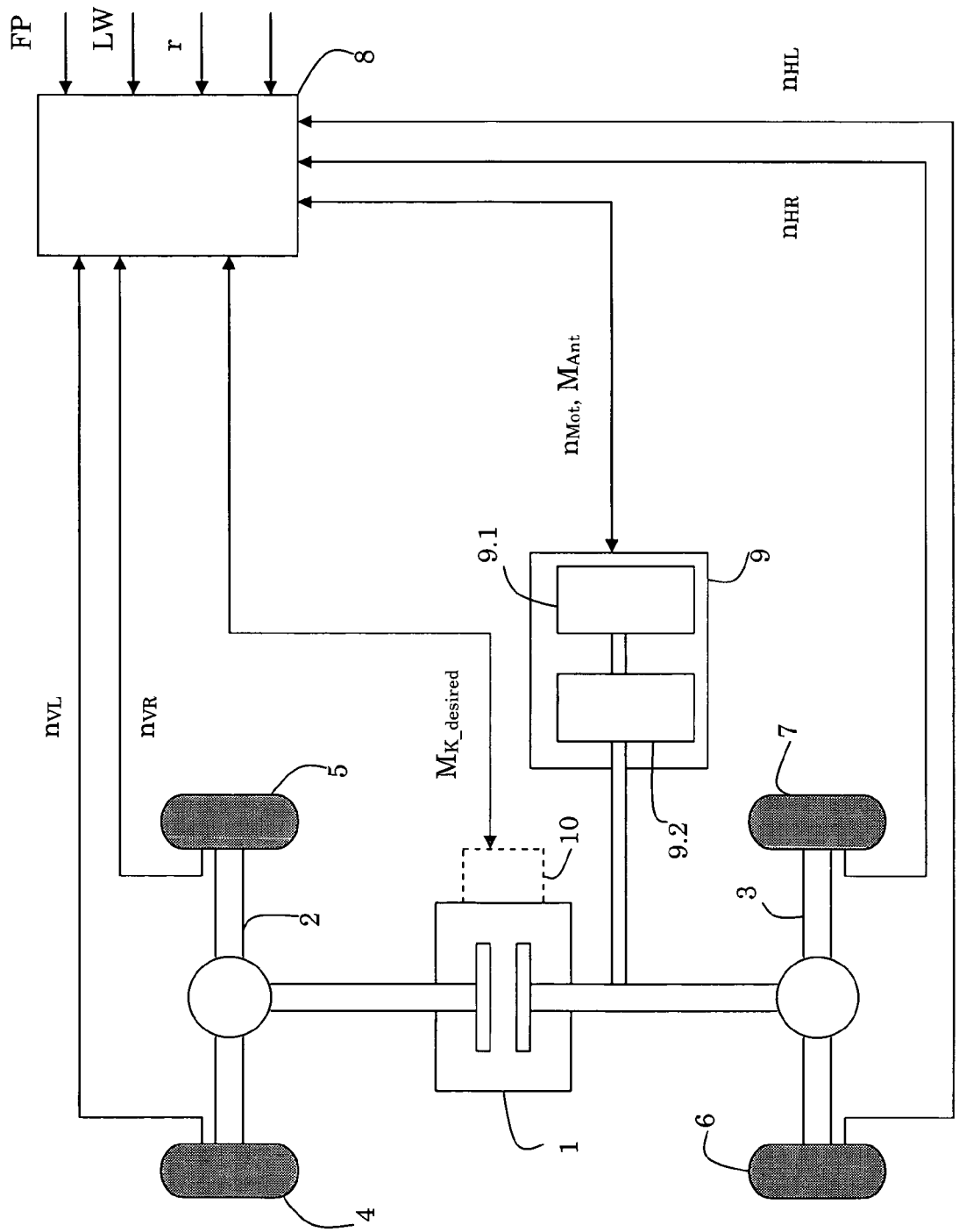
FIG. 1 is a schematic view of an exemplary embodiment of a temporarily four-wheel-driven vehicle with a transfer clutch, which can be adjusted by way of a control unit, on the example of a basically rear-wheel-driven motor vehicle with a front-wheel drive which can be connected by way of a transfer clutch.

FIG. 1 illustrates a temporarily four-wheel-driven vehicle in the form of a basically rear-wheel-driven motor vehicle with a front wheel drive which, if required, can be connected by way of a transfer clutch 1. The transfer clutch 1 can be adjusted by a control unit 8. The control unit 8 may contain an outside (for example, mounted directly on the transfer clutch 1) additional control device 10 which, for example, converts the defined desired clutch torque to electric current for controlling the adjusting unit (not shown here) of the transfer clutch 1.

In the case of a vehicle according to FIG. 1, while the transfer clutch 1 is open, the entire torque (driving torque) of the drive unit 9 is transferred to the wheels 6 and 7 of the rear axle 3 (primary driving axle). The drive unit 9 may include an internal-combustion engine 9.1, a transmission 9.2 and at least one drive control unit (not shown here in detail). The drive control unit communicates, for example, by way of the known motor vehicle data bus CAN with the control unit 8. In FIG. 1, the rear wheels 6 and 7 are the primary driving wheels because they are permanently connected with the drive unit 9. As the clutch torque at the transfer clutch 1 increases, the drive unit 9 also drives the wheels 4 and 5 of the front axle 2 (secondary driving axle). The front wheels 4 and 5 are, therefore, the secondary driving wheels.

In addition to other input signals, the control unit 8 may detect the rotational wheel speeds $n_{VL}$, $n_{HL}$, $n_{VR}$, and $n_{HR}$ of all wheels 4, 5, 6, and 7, respectively. From these rotational wheel speeds $n_{VL}$, $n_{HL}$, $n_{VR}$, and $n_{HR}$, in connection with other information present in the control unit 8, the wheel speeds $v_{VL}$, $v_{HL}$, $v_{VR}$, and $v_{HR}$ of all wheels 4, 5, 6, and 7, respectively, as well as the vehicle speed v are determined. However, the vehicle speed v can also be detected as a separate input signal directly by a sensor or indirectly by way of another control device. Furthermore, the control unit 8 detects or determines, for example, the accelerator pedal position FP, the rotational engine speed $n_{Mot}$, the engine torque (=internal-combustion engine torque) or the driving torque $M_{Ant}$ (=transmission-output-side cardan shaft torque), the steering angle LW and the yaw rate or yaw angle speed r.

For the distribution of the driving torque of the drive unit 9, a clutch torque $M_{K\_desired}$ to be adjusted is defined for the transfer clutch 1 arranged between the drive unit 9 or the primary driving wheels 6 and 7 and the secondary driving wheels 4 and 5. The control unit 8 may emit the desired clutch torque $M_{K\_desired}$ to the additional control device 10. The additional control device 10 converts the desired clutch torque $M_{K\_desired}$ to a current for controlling the actuator device not shown here separately.

Figure 2:
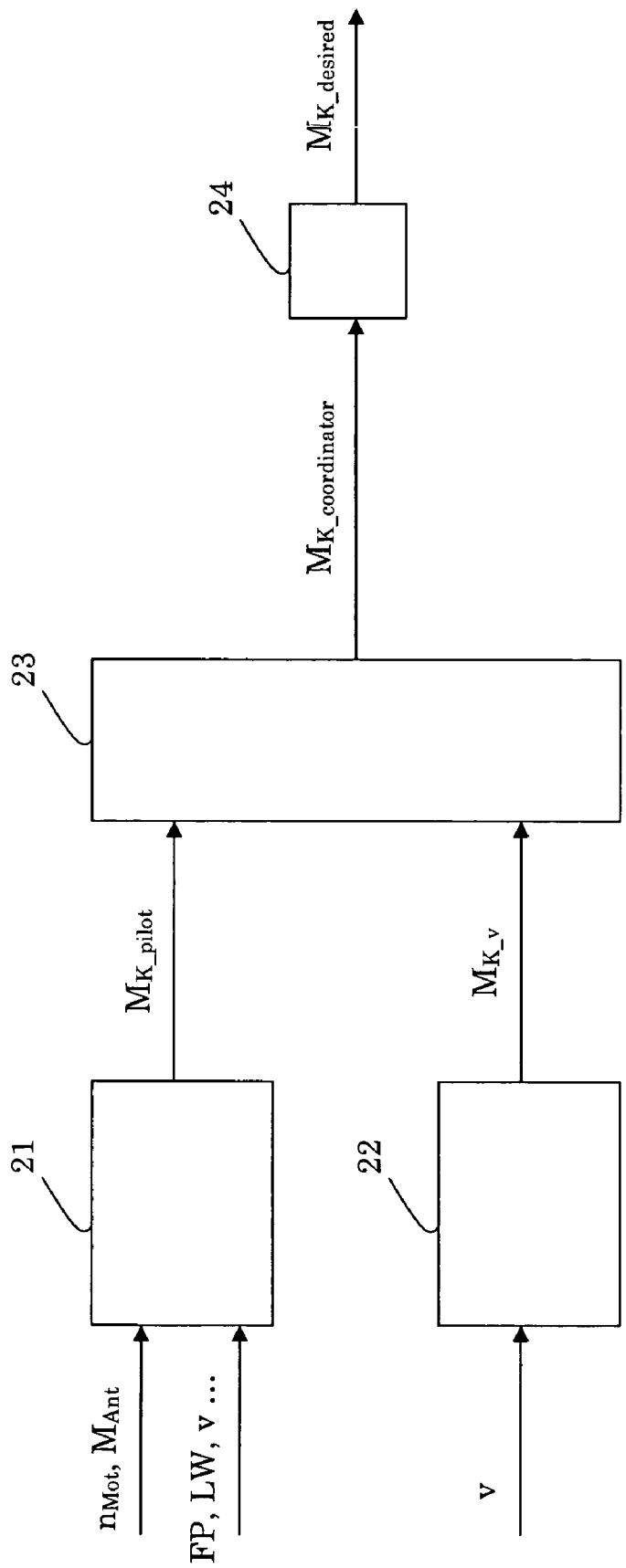
FIG. 2 is a view of exemplary cutouts of the control unit.

FIG. 2 shows additional details of the control unit 8.

In a pilot control unit 21, a pilot control fraction $M_{K\_pilot}$ is determined, for example, as a function of the accelerator pedal position FP, of the rotational engine speed $n_{mot}$, of the engine torque (=internal-combustion engine torque) or the drive torque $M_{Ant}$ (=transmission-output-side cardan shaft torque), of the steering angle LW and of the vehicle speed v.

As a function of the vehicle speed v, the speed-range-related clutch torque $M_{K\_v}$ is determined in the component protection unit 22. In this case, three speed ranges B1, B2, and B3 (compare also FIG. 3) may be defined: a starting range B1 (such as 0<v<20 km/h), a normal range B2 (such as 20<v<180 km/h), and a high-speed range B3 (such as v>180 km/h). The speed ranges do not necessarily have to adjoin one another; additional transition ranges can also be defined (not shown here).

In principle, a speed-range-related clutch torque $M_{K\_v}$ is defined as being higher in the starting range B1 than in the normal range B2. In the normal range B2, in turn, a higher speed-range-related clutch torque $M_{K\_v}$ is, in principle, defined to be higher than in the high-speed range B3. The speed-range-related clutch torques $M_{K\_v}$ can be defined as maximally permissible limit torques $M_{K\_v\_B1}$, $M_{K\_v\_B2}$, and $M_{K\_v\_B3}$ in the respective speed range B1, B2, and B3. The term "limit torques" also includes limit torque courses.

Figure 3:
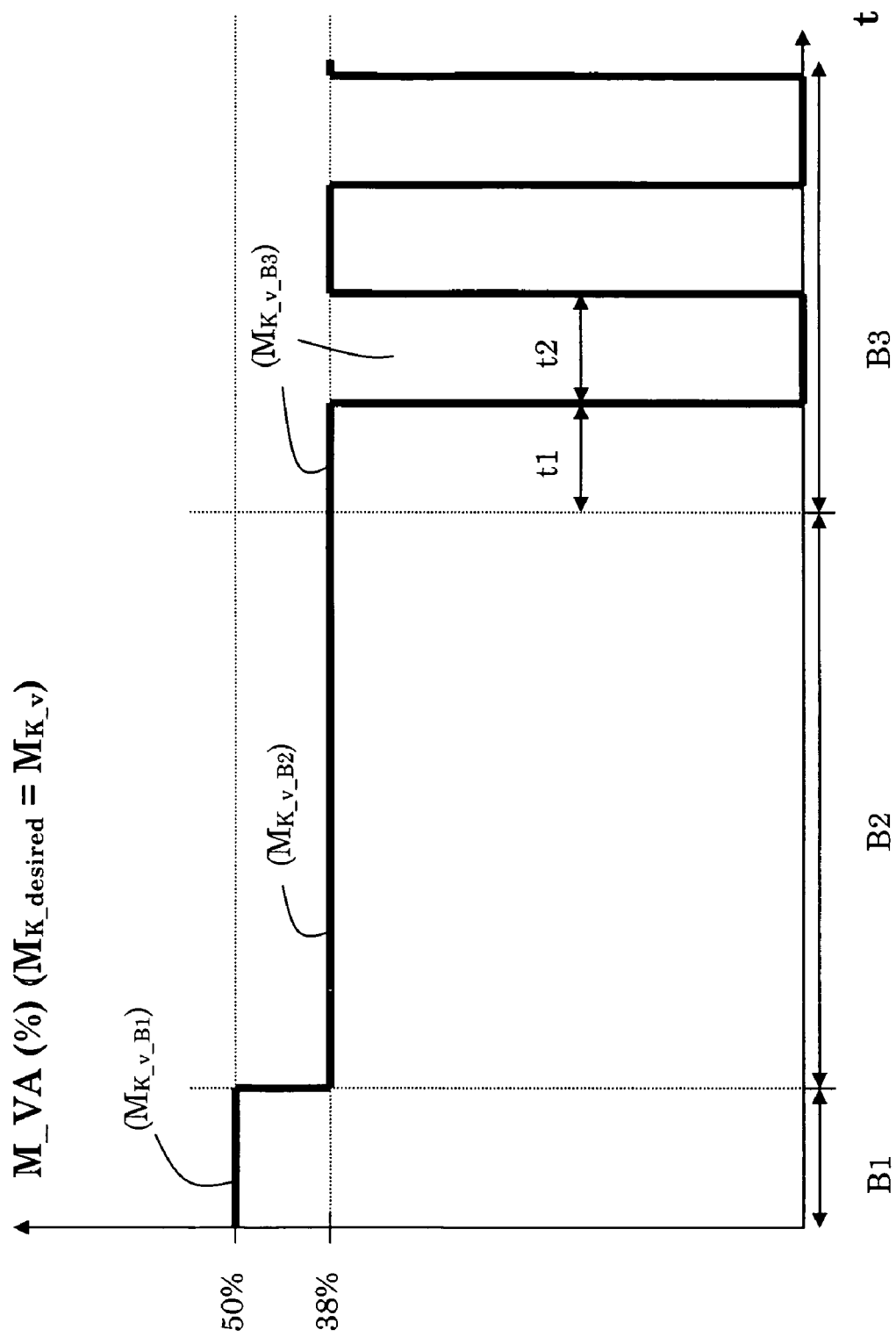
FIG. 3 is a view of an exemplary definition of speed-range-related clutch torques.

An exemplary embodiment is illustrated in FIG. 3. In FIG. 3, the time t is entered on the abscissa, and the torque fraction M_VA of the driving torque at the secondary driving wheels or the secondary driving axle is entered in % on the ordinate, which torque fraction M_VA would occur if the speed-range-related clutch torque $M_{K\_V}$ would actually be set as the desired clutch torque $M_{Kdesired}$. This may depend on additional conditions.

When the starting range B1 is present in FIG. 3, a constant limit torque MK_V_B1 is defined for reaching a torque fraction M_VA of approximately 50% (traction-optimized distribution of the driving torque in the case of a vehicle with an axle load distribution of 1:1).

When the normal range B2 is present, a constant limit torque $M_{K\_v\_B2}$ is defined for reaching a torque fraction M_VA of approximately 38% (component-stability-optimizing distribution of the driving torque in the case of a vehicle whose differential, for example, at the primary driving axle, for long durations, is dimensioned only for 62% driving torque).

When the high-speed range B3 is present, the transfer clutch 1 is periodically connected and disconnected, such that, alternately, a torque fraction M_VA of 38% (component-stability-optimizing distribution of the driving torque) and of 0% (twist-minimizing distribution of the driving torque) occurs. The "limit torque" $M_{K\_v\_B3}$ defined for this purpose is a corresponding limit torque course. As a result, a virtual average limit torque below the limit torque for the normal range B2 is also obtained. The periodic connecting and disconnecting of the transfer clutch can take place by a PWM signal, the pulse duty factor (e.g., t1/12) being determinable as a function of the dimensioning of the component to be protected. This permits an adaptation of the component dimensioning for the switch-on duration t1. The alternating increasing and decreasing of the speed-range-related clutch torque may be defined, for example, for a predetermined time and, optionally, also only when a defined outside temperature threshold is exceeded.

In FIG. 2, the pilot control fraction $M_{K\_pilot}$ and the speed-range-related clutch torque $M_{K\_v}$ are emitted to a coordinator unit 23. In the coordinator unit 23, a minimal selection from the two torque values may take place for the component protection. In a subsequent processing unit 24, corrections of the torque value determined in the coordinator unit 23 are carried out, for example, while taking into account controller fractions related to driving dynamics and the loading of the actuator. The output signal of the subsequent processing unit 24 is the desired clutch torque $M_{K\_desired}$ to be actually set. The finally determined desired clutch torque $M_{K\_desired}$, which may, but does not have to, be the speed-range-related clutch torque $M_{K\_V}$, may be emitted to the additional control device 10 (compare FIG. 1).

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A control device for an at least partially four-wheel-driven motor vehicle, having a control unit which variably distributes driving torque of a drive unit as a function of operating conditions to primary driving wheels, which are permanently connected with the drive unit, and to secondary driving wheels which, if required, can be connected by way of a transfer clutch with the drive unit, wherein the control unit determines a desired clutch torque which is to be set by an actuator device at the transfer clutch;

wherein the vehicle speed is an operating condition;

wherein, when the desired clutch torque is determined, at least one defined high-speed range is taken into account;

wherein a speed-range-related clutch torque assigned to the defined high-speed range is defined as a maximally permissible limit torque; and wherein, when the defined high-speed range is present, the speed-range-related clutch torque is a clutch torque course by which, alternately, an increase and a decrease of the clutch torque is defined.

2. The control device according to claim 1, wherein the speed-range-related clutch torque is alternately set to about zero and to a component-stability-optimizing value.

3. The control device according to claim 2, wherein a differentiation is made between a defined speed-related starting range, a defined speed-related normal range and the defined high-speed range, and wherein a speed-range-related clutch torque assigned to the starting range, a speed-range-related clutch torque assigned to the normal range and a speed-range-related clutch torque assigned to the high-speed range are defined.

4. The control device according to claim 3, wherein, when the defined speed-related starting range is present, a speed-range-related clutch torque is defined such that, when the speed-range-related clutch torque is set as the desired clutch torque, a traction-optimizing distribution of the driving torque is reached.

5. The control device according to claim 3, wherein, when the defined speed-related normal range is present, a speed-range-related clutch torque is defined such that, when the speed-range-related clutch torque is set as the desired clutch torque, a component-stability-optimizing distribution of the driving torque is reached.

6. The control device according to claim 3, wherein, when the defined high-speed range is present, a speed-range-related clutch torque is defined such that, when the speed-range-related clutch torque is set as the desired clutch torque, a component-stability-optimizing and simultaneously twist-minimizing distribution of the driving torque is reached.

7. The control device according to claim 1, wherein a differentiation is made between a defined speed-related starting range, a defined speed-related normal range and the defined high-speed range, and wherein a speed-range-related clutch torque assigned to the starting range, a speed-range-related clutch torque assigned to the normal range and a speed-range-related clutch torque assigned to the high-speed range are defined.

8. The control device according to claim 7, wherein, when the defined speed-related starting range is present, a speed-range-related clutch torque is defined such that, when the speed-range-related clutch torque is set as the desired clutch torque, a traction-optimizing distribution of the driving torque is reached.

9. The control device according to claim 7, wherein, when the defined speed-related normal range is present, a speed-range-related clutch torque is defined such that, when the speed-range-related clutch torque is set as the desired clutch torque, a component-stability-optimizing distribution of the driving torque is reached.

10. The control device according to claim 7, wherein, when the defined high-speed range is present, a speed-range-related clutch torque is defined such that, when the speed-range-related clutch torque is set as the desired clutch torque, a component-stability-optimizing and simultaneously twist-minimizing distribution of the driving torque is reached.

11. A control device for an at least partially four-wheel-driven motor vehicle, having a control unit which variably distributes driving torque of a drive unit as a function of operating conditions to primary driving wheels, which are permanently connected with the drive unit, and to secondary driving wheels which, if required, can be connected by way of a transfer clutch with the drive unit, wherein the control unit determines a desired clutch torque which is to be set by an actuator device at the transfer clutch;

wherein the vehicle speed is an operating condition;

wherein, when the desired clutch torque is determined, at least one defined high-speed range is taken into account:

wherein a speed-range-related clutch torque assigned to the defined high-speed range is defined as a maximally permissible limit torque; and wherein a differentiation is made between a defined speed-related starting range, a defined speed-related normal range and the defined high-speed range, and wherein a speed-range-related clutch torque assigned to the starting range, a speed-range-related clutch torque assigned to the normal range and a speed-range-related clutch torque assigned to the high-speed range are defined.

12. The control device according to claim 11, wherein, when the defined speed-related starting range is present, a speed-range-related clutch torque is defined such that, when the speed-range-related clutch torque is set as the desired clutch torque, a traction-optimizing distribution of the driving torque is reached.

13. The control device according to claim 12, wherein, when the defined speed-related normal range is present, the speed-range-related clutch torque is defined such that, when the speed-range-related clutch torque is set as the desired clutch torque, a component-stability-optimizing distribution of the driving torque is reached.

14. The control device according to claim 13, wherein, when the defined speed-related normal range is present, a speed-range-related clutch torque is defined such that, when the speed-range-related clutch torque is set as the desired clutch torque, a component-stability-optimizing distribution of the driving torque is reached.

15. The control device according to claim 13, wherein, when the defined high-speed range is present, a speed-range-related clutch torque is defined such that, when the speed-range-related clutch torque is set as the desired clutch torque, a component-stability-optimizing and simultaneously twist-minimizing distribution of the driving torque is reached.

16. The control device according to claim 12, wherein, when the defined high-speed range is present, a speed-range-related clutch torque is defined such that, when the speed-range-related clutch torque is set as the desired clutch torque, a component-stability-optimizing and simultaneously twist-minimizing distribution of the driving torque is reached.

17. The control device according to claim 11, wherein, when the defined speed-related normal range is present, a speed-range-related clutch torque is defined such that, when the speed-range-related clutch torque is set as the desired clutch torque, a component-stability-optimizing distribution of the driving torque is reached.

18. The control device according to claim 11, wherein, when the defined high-speed range is present, a speed-range-related clutch torque is defined such that, when the speed-range-related clutch torque is set as the desired clutch torque, a component-stability-optimizing and simultaneously twist-minimizing distribution of the driving torque is reached.

* * * * *